United States Patent
Kakutani et al.

(10) Patent No.: US 9,117,163 B2
(45) Date of Patent: Aug. 25, 2015

(54) PRINTING APPARATUS AND METHOD CONFIGURED FOR RE-HALFTONE IMAGE DATA

(71) Applicant: SEIKO EPSON CORPORATION, Tokyo (JP)

(72) Inventors: Toshiaki Kakutani, Nagano (JP); Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/199,052

(22) Filed: Mar. 6, 2014

(65) Prior Publication Data

US 2014/0268241 A1 Sep. 18, 2014

(30) Foreign Application Priority Data

Mar. 13, 2013 (JP) ................. 2013-050427

(51) Int. Cl.
 *H04N 1/405* (2006.01)
 *G06K 15/02* (2006.01)
(52) U.S. Cl.
 CPC ............ *G06K 15/1881* (2013.01); *H04N 1/405* (2013.01)
(58) Field of Classification Search
 None
 See application file for complete search history.

(56) References Cited

U.S. PATENT DOCUMENTS

| | | | |
|---|---|---|---|
| 5,553,166 A | 9/1996 | Kakutani | |
| 5,748,336 A | 5/1998 | Kakutani | |
| 6,020,897 A * | 2/2000 | Carlsen et al. | 345/629 |
| 6,055,065 A * | 4/2000 | Rao et al. | 358/1.9 |
| 6,099,105 A | 8/2000 | Kakutani | |
| 6,108,452 A * | 8/2000 | Ilbery | 382/252 |
| 6,633,411 B1 * | 10/2003 | Rao et al. | 358/2.1 |
| 6,717,696 B1 * | 4/2004 | Wang et al. | 358/1.9 |
| 7,133,161 B2 * | 11/2006 | Xu et al. | 358/3.26 |
| 8,049,929 B2 * | 11/2011 | Loce et al. | 358/3.06 |
| 8,576,450 B2 * | 11/2013 | Shepherd et al. | 358/3.06 |
| 2007/0053003 A1 * | 3/2007 | Loce et al. | 358/3.06 |
| 2008/0309953 A1 * | 12/2008 | Feng | 358/1.9 |
| 2011/0243429 A1 * | 10/2011 | Yao | 382/162 |
| 2012/0327478 A1 * | 12/2012 | Shepherd et al. | 358/3.06 |

FOREIGN PATENT DOCUMENTS

| | | |
|---|---|---|
| JP | 09-163141 A | 6/1997 |
| JP | 10-248016 A | 9/1998 |
| JP | 3208777 B2 | 9/2001 |
| JP | 2002-154246 A | 5/2002 |
| JP | 3360391 B2 | 12/2002 |
| JP | 2003-224719 A | 8/2003 |
| WO | 98/03341 A1 | 1/1998 |

* cited by examiner

*Primary Examiner* — Dung Tran
(74) *Attorney, Agent, or Firm* — Global IP Counselors, LLP

(57) ABSTRACT

An image data processing apparatus processes previously halftoned data that has been halftoned so that a proportion of dot formation corresponding to gradation values of an image reaches a first dot generation rate, as image data representative of the image. The image data processing apparatus includes a re-halftone processing unit configured to carry out a re-halftone process by using an error diffusion technique based on first gradation values corresponding to ON-dots in the previously halftoned data, and an ON-dot gradation value setting unit configured to set second gradation values corresponding to the ON-dots in the re-halftone process using the error diffusion technique, such that the dot generation rate in the re-halftone process reaches a second dot generation rate different from the first dot generation rate.

8 Claims, 10 Drawing Sheets

| Model Name | Small Dot | Medium Dot | Large Dot | No Dot |
|---|---|---|---|---|
| ML | 10pl | 20pl | 40pl | 0 |
| KG | 9pl | 18pl | 36pl | 0 |
| SP | 8pl | 16pl | 32pl | 0 |
| Dot Data | 01 | 10 | 11 | 00 |

| | Original Data Generation Model | | | |
|---|---|---|---|---|
| Vold/Vnew | ML | KG | SP | ... |
| Target Model ML | | 229/255 | 204/255 | ... |
| KG | 255/229 | | 226/255 | ... |
| SP | 255/204 | 255/226 | | ... |
| ⋮ | ... | ... | ... | |

ORIGINAL PREVIOUSLY HALFTONED DOT DATA

| 255 | 0 | 0 | 0 | 0 | 0 |
|-----|-----|---|---|-----|-----|
| 0 | 0 | 0 | 255 | 0 | 0 |
| 0 | 255 | 0 | 0 | 0 | 0 |
| 255 | 0 | 0 | 0 | 0 | 255 |
| 0 | 255 | 0 | 0 | 255 | 255 |
| 255 | 255 | 0 | 0 | 255 | 255 |

Fig. 12A

INTERMEDIATE DATA TAKING ½ THE RESOLUTION WITH AVERAGING PROCESS

| 64 | 64 | 0 |
|-----|-----|-----|
| 128 | 0 | 64 |
| 191 | 0 | 255 |

Fig. 12B

DOT DATA AFTER CONVERSION RETURNING RESOLUTION TO ORIGINAL

| 64 | 64 | 64 | 64 | 0 | 0 |
|-----|-----|-----|-----|-----|-----|
| 64 | 64 | 64 | 64 | 0 | 0 |
| 128 | 128 | 0 | 0 | 64 | 64 |
| 128 | 128 | 0 | 0 | 64 | 64 |
| 191 | 191 | 0 | 0 | 255 | 255 |
| 191 | 191 | 0 | 0 | 255 | 255 |

Fig. 12C

PRINTING APPARATUS AND METHOD CONFIGURED FOR RE-HALFTONE IMAGE DATA

CROSS-REFERENCE TO RELATED APPLICATIONS

This application claims priority to Japanese Patent Application No. 2013-050427 filed on Mar. 13, 2013. The entire disclosure of Japanese Patent Application No. 2013-050427 is hereby incorporated herein by reference.

BACKGROUND

1. Technical Field

The present invention relates to a technique for converting previously halftoned data and carrying out printing.

2. Related Art

In recent years, with developments in printing technology spreading in every direction, printing is no longer limited to being on paper, but rather there is now also printing on a variety of media such as resin sheets and labels, as well as printing called digital textile printing in which ink is discharged directly onto a cloth to dye a pattern or the like. There has also been usage in processes for manufacturing semiconductors, the coating of glass substrates to form transparent electrodes, and the like.

As such printing technologies have become increasingly differentiated and generalized, a variety of forms for handling print data have also been born. Conventionally, with computer-based or similar design and creation of digital data, the user has operated the computer with the desire to "print", thereby generating print data which is then outputted to a printer serving as a print apparatus. Because typically computer displays employ the RGB color system, and because the data is handled at a resolution independent of the resolution of the print apparatus, printing entails color-converting RGB data into a color system (typically CMYK) that corresponds to the ink system used for printing, and converting to dot data that is matched to the resolution and gradation values of the print apparatus. The gradation values handled by a print apparatus varies depending on the model of the print apparatus, and are binary when it is only question of whether or not a dot of a specific ink is formed, ternary (none, light dot, dense dot) in a case where a high-/low-concentration ink is used, or quaternary (none, small, medium, large) in a case where small, medium, and large dots can be formed. It shall be readily understood that multi-valued representation (for example, quinary or septenary) is also possible in combinations of high-/low-concentration ink and small/large dots or small/medium/large dots. Additionally, though only dots of the same shape can be formed, techniques of discharging an ink droplet zero to N times at the same position and thereby performing multi-bit representation corresponding to the number of times N have also been proposed and put into practical use.

In any event, on a computer, there needs to be a process for converting multiple-tone image data, in which representation is often with eight bits for RGB each, meaning a total of 24 bits, to dot data of a low gradation value. This process is usually called either a halftone process (halftoning) or a multi-value conversion process. The computer transmits the dot data, which has previously undergone the multi-value conversion process, to a printer serving as a print apparatus, and the printer drives a printing head and carries out printing in conformity with the dot data. There are a variety of types of print apparatuses in existence, such as inkjet printers that discharge ink droplets and page printers that form one page of latent image onto a photosensitive drum to transfer toner, but an inkjet printer is often used in a case where the medium being printed on is cloth, a semiconductor substrate, or the like. This is because a configuration where printing is performed by moving the printing head in a relative manner with respect to these print media is more readily compatible with different types and sizes of medium. Inkjet printers to begin with include not only serial-type printers in which a print head moves in the width direction of the print medium (a main scanning direction), but also line printers provided with a broad print head able to discharge ink across the width direction of the print medium.

The dot data that is outputted to the print apparatus is temporarily stored in the print apparatus, but usually is sequentially updated as the print process proceeds and, when printing is complete, is deleted from the print apparatus. Specific technical fields, however, have the desire for saving and then repeatedly using the dot data that is generated for the print apparatus. When, for example, textile printing is considered, in instances of digital printing, it is not that a large quantity of cloth of the same pattern is made, but rather production would be high-mix low-volume, and conceivably cloth of the same design would be repeatedly printed in accordance with the demand. Similarly, in fields such as semiconductor substrate manufacturing, too, a similar desire would be present in instances of use in high-mix low-volume production. Apparatuses called page composers, for saving such printing dot data and summoning the data as needed to carry out printing, have therefore also been used.

Moreover, auxiliary models that are small-scale or of a different print resolution may be additionally introduced into an environment to which, for example, principal models capable of large-format printing or high-resolution printing have already been introduced, and in such or similar cases there has been a desire to endow the auxiliary models with compatibility with the principal models and be able to print by directly inputting the halftoned result of the principal models without alteration. See, Japanese Laid-open Patent Application No. 2003-224719, Japanese Laid-open Patent Application No. 2002-154246 and Japanese Laid-open Patent Application No. 10-248016, for example.

SUMMARY

However, a problem has emerged in that the printing dot data is typically only used at the relevant print apparatus therefor. In a case where print apparatuses differ in terms of the size of ink droplets being discharged, then the concentration of each of the colors of ink would no longer be the same when dot data that is the halftoned result for another print apparatus is used. This problem arises because of the individual differences not only between different models but also, in a strict sense, also between print apparatuses even of the same model.

This has resulted in conventional proposals attempting to print by correcting the dot data as appropriate, taking into consideration the differences in the properties involved in print concentration (size of ink droplets, or ink concentration) between the dots of the print apparatus for which the dot data was generated and the dots of a print apparatus attempting to print by utilizing that dot data. Another problem, however, has emerged in that because the arrangement of dots has been optimized for the original dot data, the image quality ends up declining when dots are simply culled or watered down. Here, for the dot arrangement to have been optimized signifies, for example, cases such as the following.

When, in a low-gradation-value region, the dispersibility of the dots has been made to exhibit a favorable property of dispersibility such as blue noise properties.

When, in a high-gradation-value region, the arrangement of pixels at which a dot is not formed is made to exhibit blue noise properties or the like.

When, at a predetermined gradation value or lower, dots of different ink colors are arranged so as to overlap or be connected.

In a case where such arrangements for enhancing the dispersibility of the dots have been performed, there has yet to be found any method for processing the dot data that has been halftoned in advance and converting the dot data to an optimal arrangement specific for another model without incurring a deterioration in the image quality. It would be conceivable also to use a technique (see, for example, Japanese Laid-open Patent Application No. 10-248016) by which an image that has been momentarily halftoned and undergone bit reduction is restored to an original continuous-tone image, and again halftone the restored image data, but restoring the continuous-tone image ends up requiring an extremely complex process. The resolution is also decreased, among other considerable disadvantages. There has been moreover been a desire to reduce scale, reduce costs, conserve resources, simplify manufacturing, improve usability, and so forth with conventional image data conversion apparatuses and print apparatuses.

The present invention has been made in order to resolve the foregoing problems at least in part, and can be implemented as the following aspects.

(1) According to one aspect of the present invention, provided is an image data processing apparatus for processing image data representative of an image, using as input data previously halftoned data that has been halftoned so that a proportion of dot formation corresponding to gradation values of the image reaches a first dot generation rate. The image data processing apparatus is provided with a re-halftone processing unit and an ON-dot gradation value setting unit. The re-halftone processing unit can take a configuration for carrying out a re-halftone process by using an error diffusion technique based on first gradation values corresponding to ON-dots in the previously halftoned data. The ON-dot gradation value setting unit can set second gradation values corresponding to the ON-dots in the re-halftone process using the error diffusion technique, such that the dot generation rate in the re-halftone process reaches a second dot generation rate different from the first dot generation rate. This manner of setting the first gradation values and the second gradation values makes it possible to properly control the second dot generation rate, which is the generation rate of dots processed by the re-halftone process. The previously halftoned data being handled as the input data may have been halftoned by an error diffusion process, but also may have been halftoned by an ordered dithering or the like.

(2) In this image data processing apparatus, the first gradation values and the second gradation values may be determined in accordance with the concentration per unit area to be realized on a medium by each of the dots being formed. According to this image data processing apparatus, the dot generate rate for each of the dots can be made to correspond to the concentration per unit area realized on the medium by each of the dots.

(3) In this image data processing apparatus, the relationship $V2=V1/(1+DP)$ may hold true between an increase-decrease rate DP for the number of dots after the re-halftone process based on the previously halftoned data, and the first gradation values V1 and second gradation values V2. So doing makes it even easier to adjust the second dot generation rate, which is the dot generation rate for after the re-halftone process.

(4) In the image data processing apparatus, the previously halftoned data can be data representative of whether or not a dot is to be formed for every dot of a first type in a first print apparatus able to form dots of the first type, and the data obtained by the re-halftone process can be data representative of whether or not to form every dot that can be formed for every dot of a second type that can be formed in a second print apparatus different from the first print apparatus. This makes it possible to print a desired image, despite a difference in the types of dots being formed, at the first print apparatus and the second print apparatus.

(5) The present invention could also be implemented as a print apparatus provided with the image data processing apparatus described above and a print part for carrying out printing using the dot data processed by the image data processing apparatus. The print apparatus can print the desired image using the previously halftoned data for the other print apparatus.

(6) In this print apparatus, the print part may form the dots of the second type different from the dots of the first type that can be formed in the other print apparatus, by discharging ink droplets onto a cloth. With print apparatuses for printing onto a cloth, previously halftoned data may in some instances be shared among different print apparatus, and in such cases the above-described print apparatus would be available.

(7) The present invention can also be implemented as a print system for printing onto a predetermined print medium. This print system is provided with: a data storage apparatus for storing a plurality of sets of previously halftoned data that has been halftoned so that a proportion of dot formation corresponding to gradation values of an image reaches a first dot generation rate; a re-halftone processing apparatus for carrying out a re-halftone process by using an error diffusion technique based on the first gradation values corresponding to ON-dots in the previously halftoned data; and a print apparatus for accepting the previously re-halftoned data and printing by forming predetermined dots on a print medium. In this print system, the halftone processing apparatus sets the second gradation values corresponding to ON-dots in the re-halftone process using the error diffusion technique so that the dot generation rate in the re-halftone process reaches a second dot generation rate different from the first dot generation rate.

With this print system, setting the first gradation values and the second gradation values makes it possible to properly control the second dot generation rate, which is the generation rate of dots processed by the re-halftone process.

(8) The present invention can also be implemented as a method for converting image data representative of an image, using as input data previously halftoned data that has been halftoned so that a proportion of dot formation corresponding to gradation values of the image reaches a first dot generation rate. With this method, carrying out a re-halftone process using an error diffusion technique based on the first gradation values corresponding to ON-dots in the previously halftoned data comprises setting second gradation values corresponding to the ON-dots in the re-halftone process using an error diffusion technique such that the dot generation rate in the re-halftone process reaches a second dot generation rate different from the first dot generation rate. As such, setting the first gradation values and the second gradation values makes it possible to properly control the second dot generation rate, which is the generation rate of dots processed by the re-halftone process.

The plurality of constituent elements possessed by each of the aspects of the present invention described above are not all essential, and some constituent elements of the plurality of constituent elements could be modified, deleted, or replaced with other new constituent elements, or the limiting content thereof could be partially deleted, in order to partially or entirely solve the above problems or in order to partially or entirely achieve the effects set forth in the present description. Some or all of the technical features included in one aspect of the present invention described above could also be combined with some or all of the technical features included in another aspect of the present invention described above to make an independent aspect of the present invention in order to partially or entirely solve the above problems or in order to partially or entirely achieve the effects set forth in the present description.

The present invention could also be realized in a variety of aspects other than apparatuses. For example, the present invention could be realized in aspects such as an apparatus for converting image data or method therefore, a computer program for realizing an image data processing method or conversion method, or a non-temporary recording medium on which the computer program is recorded.

BRIEF DESCRIPTION OF THE DRAWINGS

Referring now to the attached drawings which form a part of this original disclosure:

FIGS. 12A to 12C are descriptive diagrams illustrating a manner of resolution conversion in a tenth modification example.

DETAILED DESCRIPTION OF EXEMPLARY EMBODIMENTS

A. Hardware Configuration of the Print System

Figure 1:
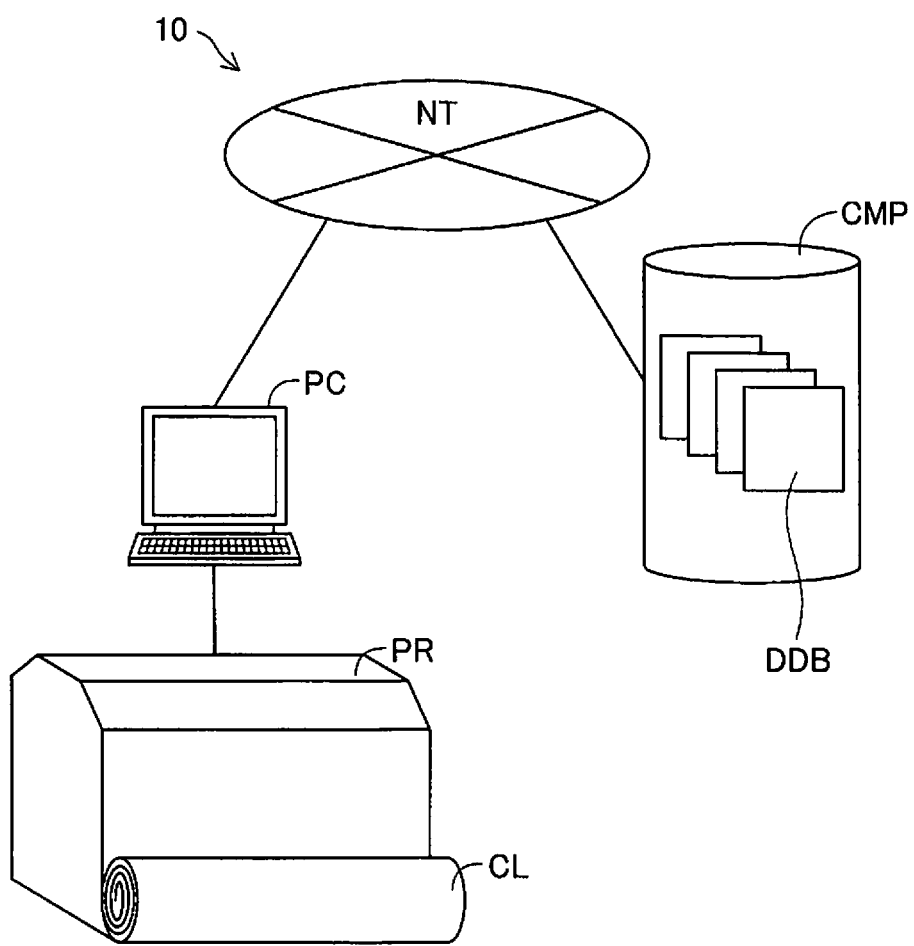
FIG. 1 is a schematic diagram illustrating a print system of a working example.

Embodiments of the present invention shall now be described with reference to the accompanying drawings. FIG. 1 is a diagram illustrating the schematic configuration of a print system 10, which is one embodiment of the present invention. As is depicted, the print system 10 is provided, inter alia, with a computer PC for creating and selecting images, a textile print machine PR that is connected to the computer PC and actually performs the printing, and a page composer CMP that is connected to the computer PC via a network NT.

The computer PC uses a graphics creation software or the like to create images intended to be printed, which are then printed by the textile print machine PR. At this time, the computer PC color-converts image data that was previously created in the RGB color system into a color system used by the textile print machine PR, and also carries out so-called halftone processes such as gradation conversion and resolution conversion for conversion to dot data for textile printing. This dot data is in some instances also directly outputted to the textile print machine PR to carry out printing, but in a case where a decision is made for a certain number of times of repeat usage or more, then the user saves the converted dot data not in the textile print machine PR but rather in the page composer CMP.

The page composer CMP is a server that is connected to the network NT; dot data for textile printing that is accepted from the computer PC is saved as a database DDB. A user connected to the network NT can access the page composer CMP, summon the required dot data from the database DDB of the dot data, and at any time output the required dot data to the textile print machine PR, to carry out printing of the same design (color, pattern). This makes it possible to shorten the processing, because there is no need for the halftone process to be performed every time the image data is printed.

Figure 2:
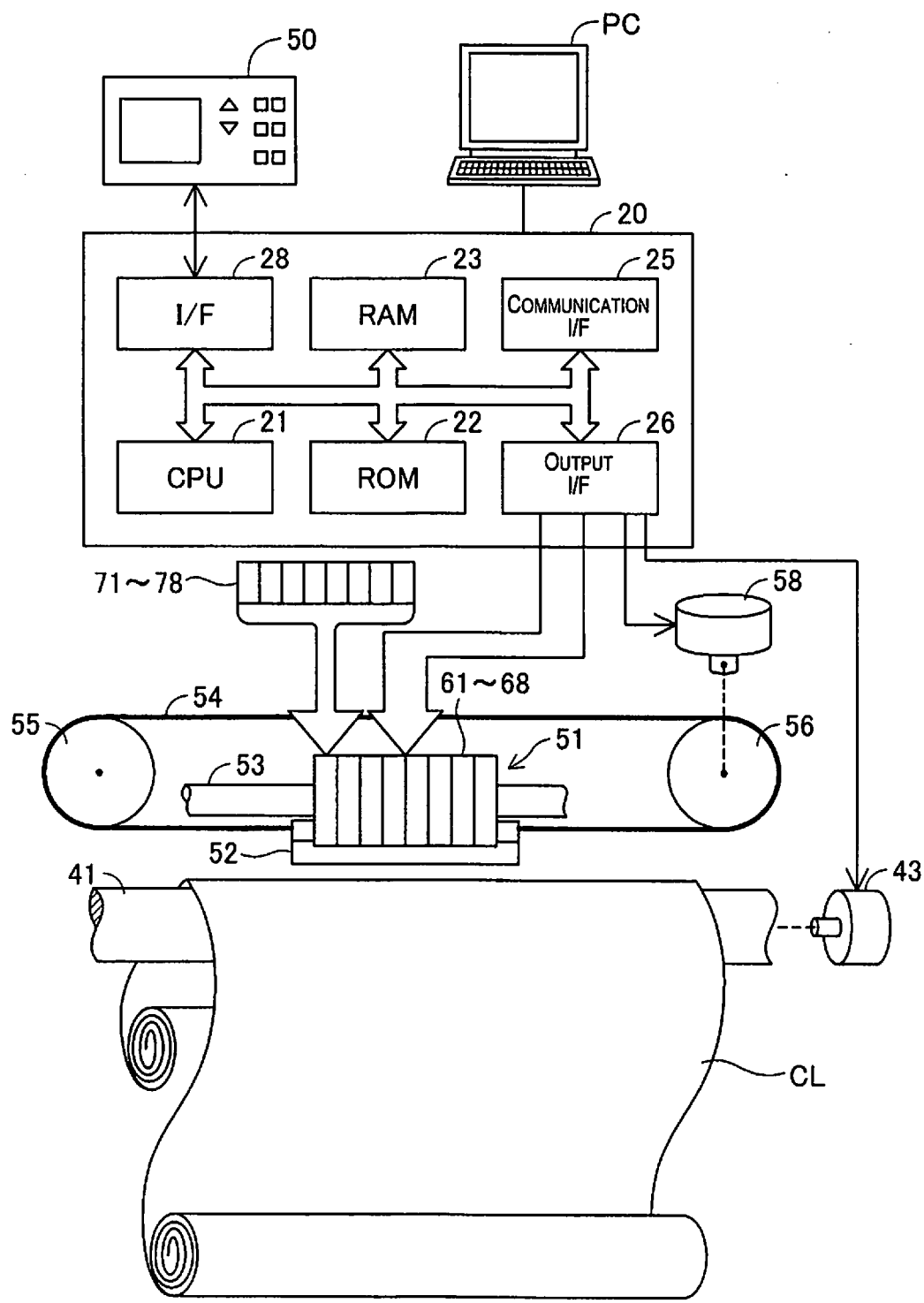
FIG. 2 is a diagram illustrating the schematic configuration of a textile printing machine.

FIG. 2 illustrates the configuration of the textile print machine PR for carrying out textile printing. The textile print machine PR is capable of textile printing by discharging ink droplets onto cloth up to 1500 mm wide (maximum thickness 8 mm). As depicted, the textile print machine PR is provided, inter alia, with: a print part 30 for carrying out the actual print operation, a control circuit 20 as a main component for carrying out a variety of controls for printing; and an operation panel 50 for accepting a user's operation and displaying required information.

The control circuit 20 is provided, inter alia, with: a CPU 21 for executing a program and thereby implementing a textile printing process (described below); a ROM 22 for storing the program; a RAM 23 used for such purposes as temporarily storing accepted dot data; a communication interface 25 for external communication such as with the computer PC; an output interface 26 for exchanging a signal with the print part 30; and an input/output interface 28 for exchanging data with the operation panel 50.

The print part 30 is provided with: a cloth conveyance mechanism for conveying a cloth CL, which is a print medium being printed on; and a head drive mechanism for driving a print head 51. The cloth conveyance mechanism is provided, inter alia, with a belt conveyance mechanism (not shown) for conveying the cloth CL, and a conveyance motor 43 for rotating a platen 41. The head drive mechanism is provided, inter alia, with a carriage 52 loaded with the print head 51 for discharging the ink droplets, a guide 53 and endless belt 54 for conveying the carriage 52 along an axial direction of the platen 51, two pulleys (55, 56) around which the endless belt 54 is stretched, and a main scanning motor 58 for turning the pulley 56 forward/in reverse and thereby causing the carriage to move reciprocatingly in a main scanning direction via the endless belt 54.

Provided to the carriage 52 are reservoirs 61 to 68 for sending each of the colors of ink to nozzles of the print head 51. Respective color ink tanks 71 to 78 are connected by a flexible tubing 80 to the reservoirs 61 to 68, respectively. Textile printing consumes a large amount of ink per one round of printing in order to print onto the cloth CL. For this reason, the small-volume reservoirs 61 to 68 are provided to the carriage 52 and ink is supplied from each of the separately installed color ink tanks 71 to 78. The volume of each of the color ink tanks 71 to 78 is 700 cc. It would also be possible for ink cartridges to be loaded onto the carriage 52, provided that the amount of ink consumed by one round of printing is adequately supplied by the cartridges. There also need not be the reservoirs.

Figure 3:
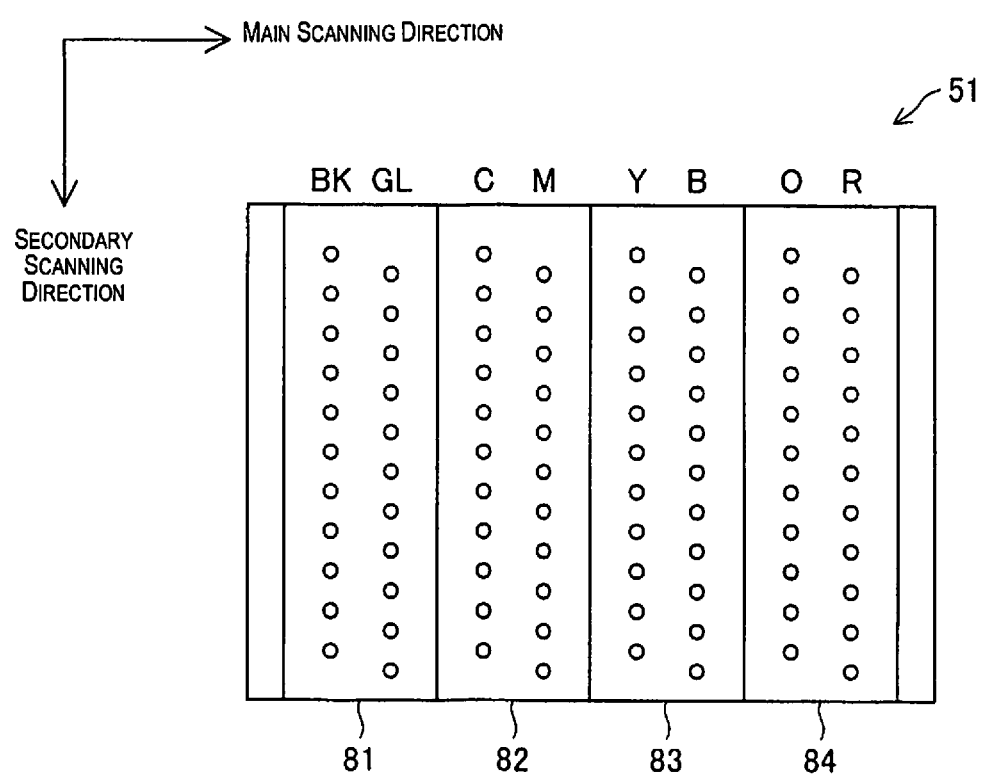
FIG. 3 is a descriptive diagram illustrating a nozzle array in a print head.

The print head 51, as illustrated in FIG. 3, is provided with a large number of the nozzles for discharging each of the colors of ink droplets. Discharging the ink droplets from these nozzles involves driving piezoelectric elements (not shown). Nozzle units 81 to 84 provided with one piezoelectric element per one nozzle are assembled onto the print head 51. Each of the nozzle units 81 to 84 is provided with 128 nozzles×two rows of nozzles. Ink for black (BK), grey (GL), cyan (C), magenta (M), yellow (Y), blue (B), orange (O), and red (R) is supplied to each of the nozzle rows from each of the color ink tanks 71 to 78, respectively. Textile printing inks can be selected from types such as "acidic", "reaction", or "dispersion", depending on the nature of the cloth CL.

B. Image Data Conversion Process

Next, a process executed by the print system 10 shall be described. This process is actually executed in the computer PC. The computer PC is internally provided with a CPU, ROM, RAM, a hard disk, and so forth; an application program stored in the hard disk is summoned to execute the process illustrated in FIGS. 4 and 6. The process comprises executing a series of "print control process" for reading the required dot data out from the database DDB of the page composer CMP, and converting and thereafter outputting same to the textile print machine PR.

Figure 4:
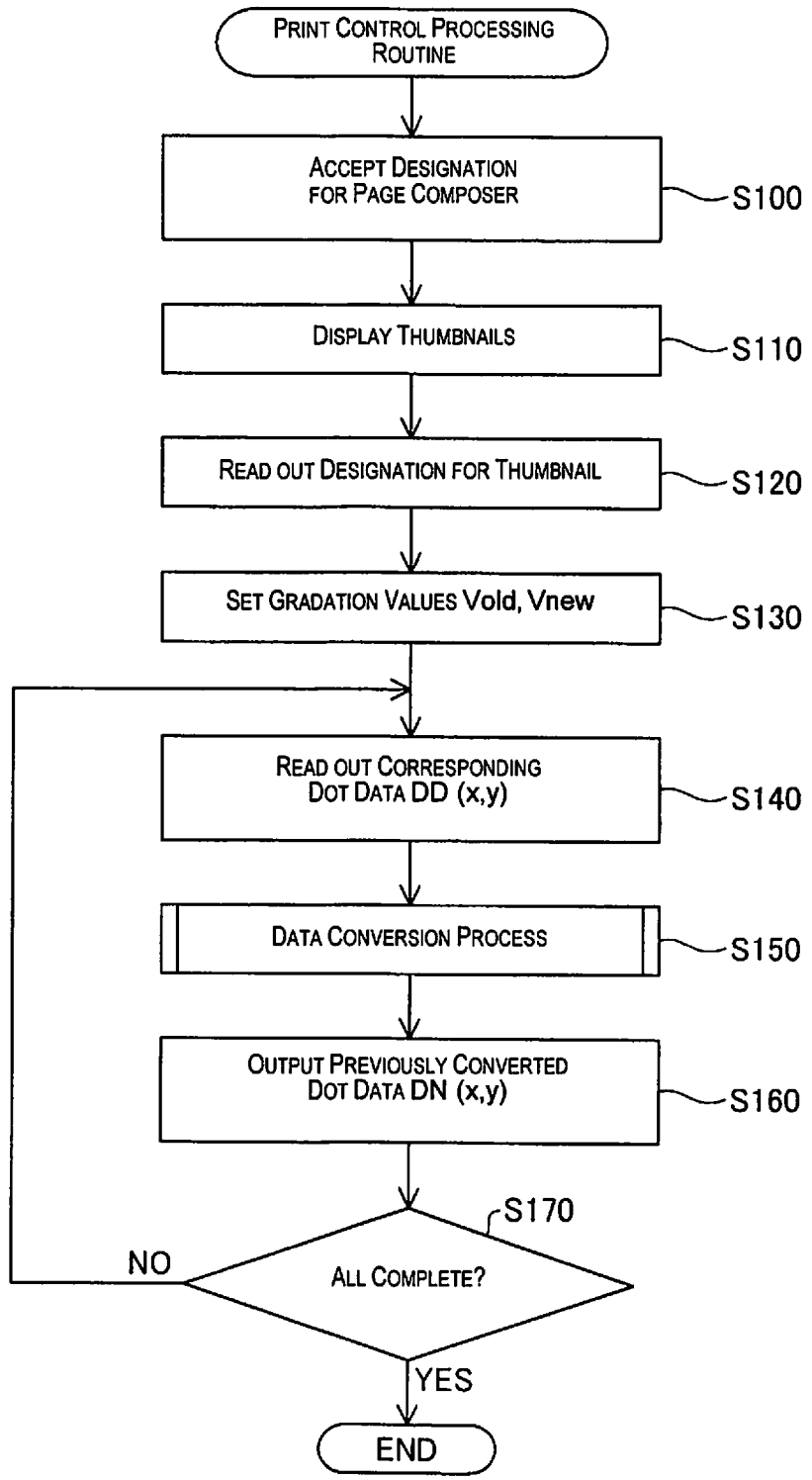
FIG. 4 is a flow chart illustrating a print control processing routine.
Figures 5, 6:
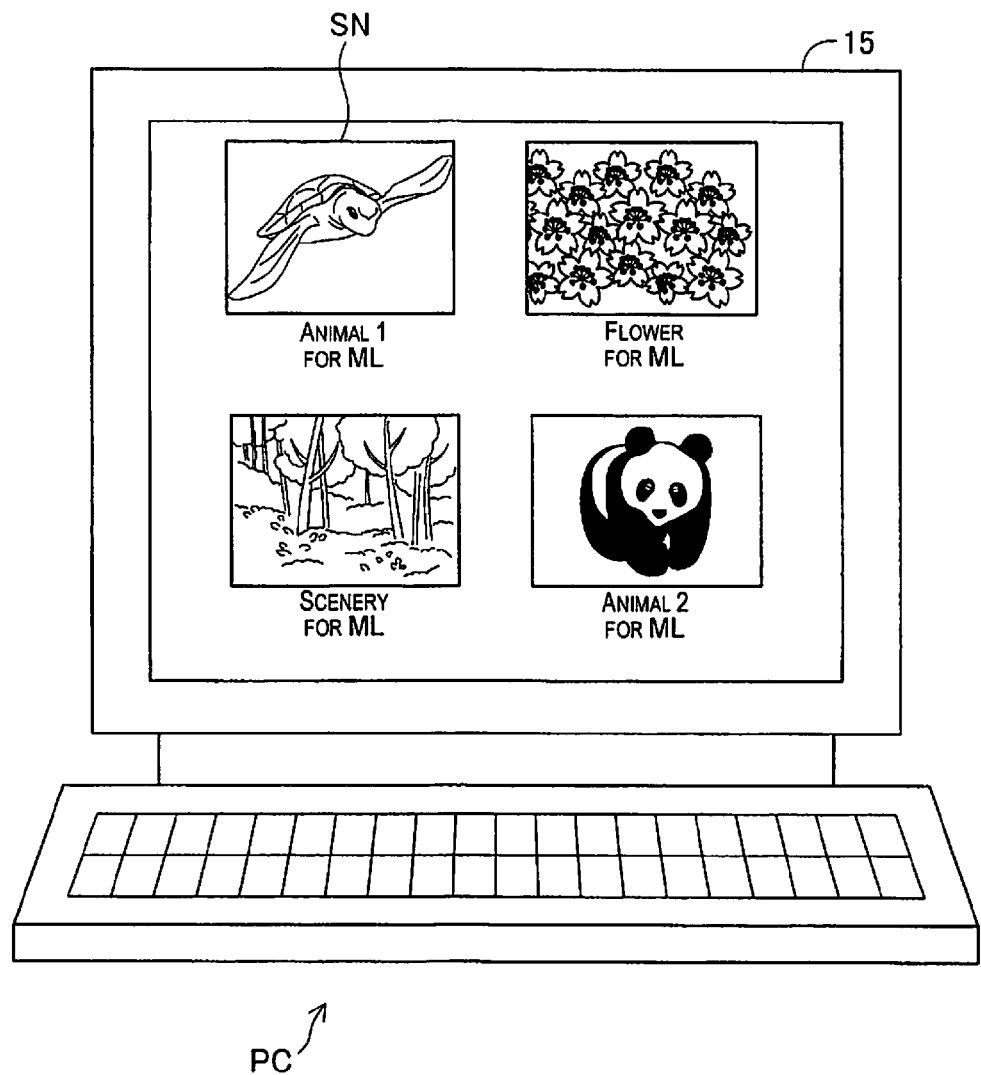
FIG. 5 is a descriptive diagram illustrating one example of a display screen of a computer.
FIG. 6 is a descriptive diagram illustratively exemplifying the discharged ink amounts for different models.

When the print control process illustrated in FIG. 4 is started, the computer PC first accepts a designation for the page composer CMP from the user (step S100). This is because it is possible for a plurality of page composers CMP to be present on the network NT, and thus the user designates one thereof. Then, the computer PC accesses the database DDB of the designated page composer CMP, reads out the dot data that is registered in the database DDB, and displays thumbnails thereof on a display screen of the computer PC (step S110). FIG. 5 illustrates one example of the screen of the computer PC that is thus displayed. The thumbnails SN display the name of a design corresponding to the dot data, and data indicative of what type of textile print machine the dot data has been made for (for ML, or the like).

The dot data directly designates whether or not ink droplets are to be discharged, and therefore is generated in accordance with the properties of the respective print machines. For example, with a textile print machine able to form small, medium, and large dots, then the four states of "not forming", "forming a small dot", "forming a medium dot", or "forming a large dot" with the ink droplets can be designated for one pixel; typically, this designation is represented by two-bit data. FIG. 6 illustratively exemplifies the sizes of the ink droplets corresponding to the small/medium/large dot data for different models. FIG. 6 illustrates three models, a model ML, KG, and SP. With each of the models, for example, the two-bit data "00", "01", "10", and "11" correspond to "do not form dot", "form small dot", "form medium dot", and "form large dot", respectively. When this dot data is generated for a textile print machine of the model ML, for example, then the small dots, medium dots, and large dots correspond to ink dots of a volume 10 pL, 20 pL, and 40 pL, respectively. By contrast, with a textile print machine of the model SP, then the small dots, the medium dots, and the large dots correspond to discharging 8-pL, 16-pL, and 32-pL ink droplets, respectively. In this instance, were the dot data stored in the database DDB to be generated for the model ML and then stored, then a case of using the dot data to print with the textile print machine of the model SP would have an about 25% increase in the total amount of ink in order for similar printing to the original textile print machine (the model ML) to be carried out on the cloth CL. A data conversion process (described below) is carried out for this purpose.

Figure 7:
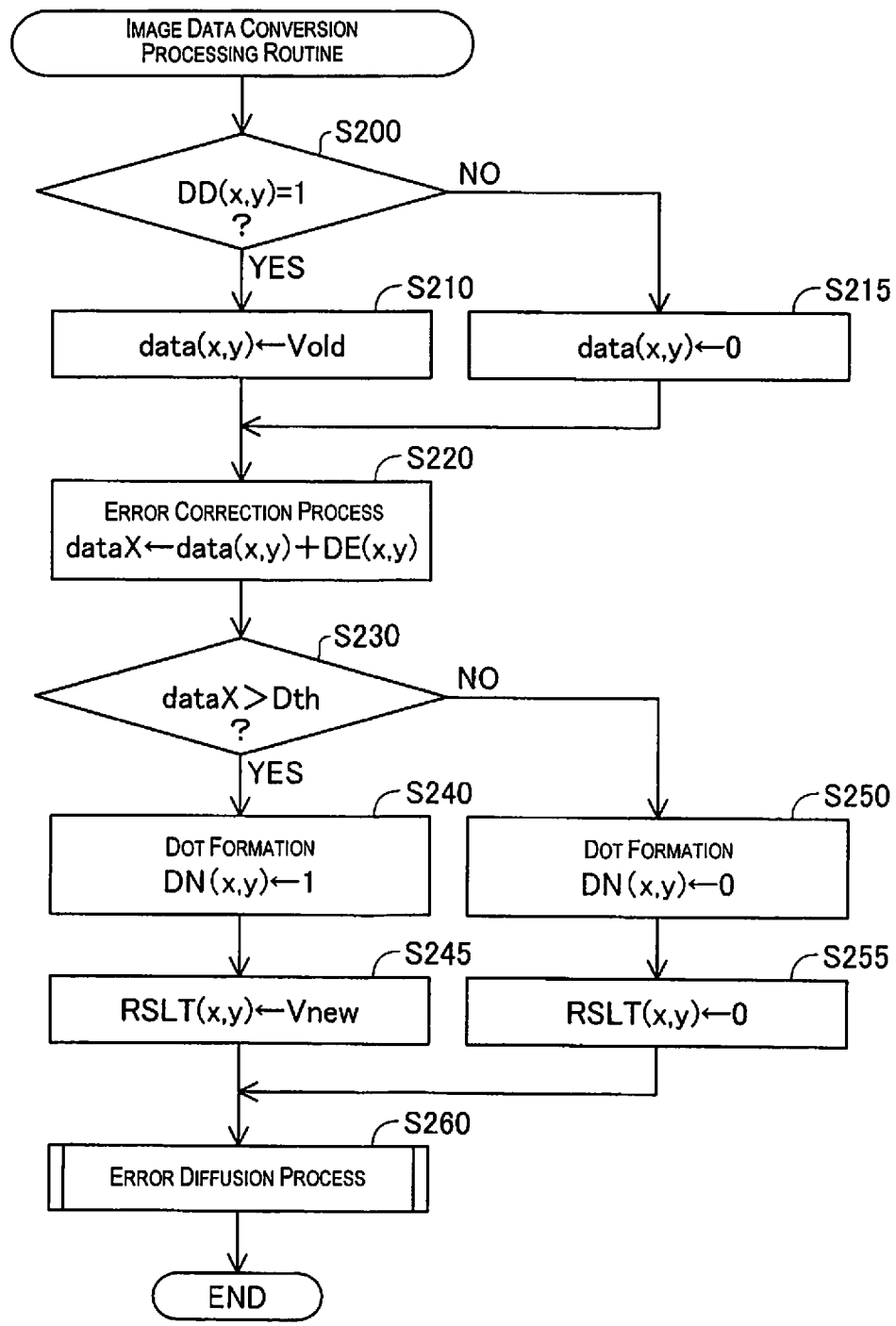
FIG. 7 is a flow chart illustrating an image data conversion processing routine.

In the state where the thumbnails are being displayed, illustrated in FIG. 5, the user utilizes a pointing device such as a mouse to designate one of the displayed thumbnails, whereupon the computer PC reads in this designation (step S120) and sets gradation values Vold and Vnew (step S130). The gradation values Vold and Vnew are set depending on which model the dot data designated by the thumbnail is intended for, and are used in the data conversion process described below. The gradation values Vnew are also called result values RSLT, the setting of which is described in greater detail with the data conversion process (FIG. 7).

Thereafter, the dot data DD (x, y) corresponding to the selected thumbnail is read out from the database DDB (step S140). Here, (x, y) are representative of the coordinates of the dot data. The values x are indicative of the coordinates in the main scanning direction (a raster direction), and the values y are indicative of the coordinates in a secondary scanning direction; the initial values are (0, 0). The dot data DD (x, y) that is read out is data representative of a pattern that is, for example, 1,500 mm wide×3,000 mm long, and is data for directly designating the discharge of the three types of dots small, medium, or large with respect to the eight colors of ink at a resolution of 720 dpi vertically and horizontally. Because the designations of no ink, small, medium, or large are made for each of the eight colors, and because two bits suffice for making the designations for small, medium, and large dots, the formation of dots of each of the eight colors can be designated for one pixel with:

8×2 bits(none,small,medium,large)=16 bits(2 bytes)

As such, representing 1,500 mm×3,000 mm at 720 dpi entails a data volume of about 90 megabytes. Reading data commensurate with this volume out from the page composer CMP in sequence, the computer PC carries out a process for conversion to data that is suitable for the textile print machine PR intended to print (step S150), and outputs the converted dot data to the textile print machine PR (step S160). The textile print machine PR resequences the received dot data into a sequence that is suitable for the printing of the print head 51, drives the piezoelectric elements provided to the print head 51 to discharge the ink droplets, and forms dots on the cloth CL, thereby forming the image.

The process of step S140 onward is repeated until the process with respect to all of the dot data is completed (step S170). In step S170, in a case where the process with respect to all of the dot data is determined not to be complete, then the coordinate x is incremented by the value 1 until the process with respect to one raster is complete; when the process with respect to one raster is complete, then the coordinate x is reset to the value 0, the coordinate y is incremented by the value 1, and the process for step S140 onward is repeated.

C. Data Conversion Process

The data conversion process (step S150) is a process which, because the dot data summoned from the page composer CMP was made for a specific model (for example, the model ML) of textile print machine, is required in order to carry out textile printing using the dot data with another mode (for example, the model SP). As illustrated in FIG. 6, even dots of the same size result in ink droplets of different volumes (sizes of dots) for every model. In some cases, the concentration of ink is also different. For this reason, the data conversion is carried out to thereby absorb these differences in ink system between models and achieve uniformly printed results. To that end, in the present embodiment, an error diffusion process is carried out with the dot data (0 or 1) that is a binarized result being regarded as being data of the predetermined gradation value Vold. The result of the error diffusion process is dot data that is indicative of whether a dot is formed (the value 1) or a dot is not formed (the value 0). At this time, a difference exists, as illustrated in FIG. 6, between the volume of the ink droplets for the dots of the original model (and the concentration that is realized accordingly) and the volume of the ink droplets that are discharged so as to correspond to the dots by the model that is actually performing the printing (and the concentration that is actually realized accordingly). Thus, performing the error diffusion process using the former concentration as Vold and the latter concentration as Vnew makes it possible to carry out the data conversion and to consequently obtain, from the dot data for a specific model, dot data with which the concentration of the realized image is substantially equivalent despite being for the other model.

A specific method of data conversion will now be described below. FIG. 7 is a flow chart illustrating an image data conversion process routine corresponding to step S150 in FIG. 4. In the following description, (x, y) are coordinates indicative of the pixel positions in an image. The pixel positions are designated such that the starting point during printing of the image is (0, 0), and x is the main scanning direction and y is the secondary scanning direction (the direction of conveyance of the cloth CL). In step S140 in FIG. 4, the dot data DD (x, y) is summoned in sequence and transferred over to the data conversion process. As described using FIG. 6, in a case where color textile printing is being carried out, then the dot data for one pixel is, in the present embodiment, data indicative of eight colors and four gradations. In the following description, for the sake of ease of understanding, dot data for one type for one color thereof shall be described by way of example. For example, the dot data DD (x, y) undergoing data conversion is understood to be indicative of forming (on, value 1) or not forming (off, value 0) a large dot of cyan ink. The approaches to and processes for dots of other colors and other sizes are still similar.

When the data conversion process is started, first a process (steps S200, S210, S215) for converting the accepted dot data DD (x, y) into gradation value data data is carried out. In this process, first a determination is made as to whether or not the dot data DD (x, y) is the value 1 (step S200); when DD (x,y)=1 is true, it is understood that a medium dot of cyan is to be formed, and the gradation value Vold is set for the gradation value data data (step S210), but when DD (x, y)=1 is not true, the value 0 is set for the gradation value data (step S215).

Figures 8, 9:
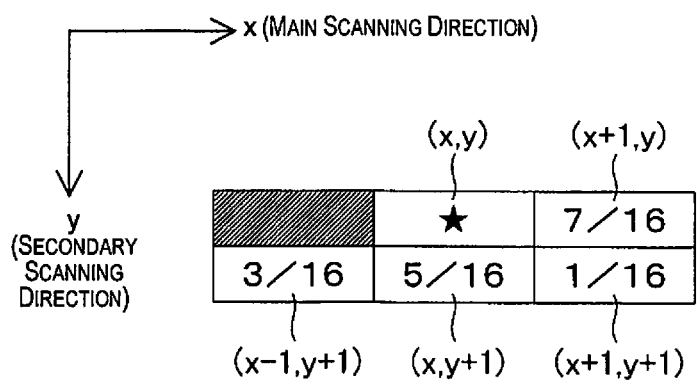
FIG. 8 is a descriptive diagram illustratively exemplifying a diffusion range in an error diffusion process.
FIG. 9 is a descriptive diagram illustratively exemplifying the relationship in gradation values between an original data generation model and a target model.

The gradation value Vold that is set in step S210 is a value determined from the relationship between the model for which the original dot data was generated and the model where printing is to be carried out (hereinafter called the target model). FIG. 8 illustrates the relationship between the two. As illustrated in FIG. 6, the different models of textile print machine differ in terms of the ink volumes for the small, medium, and large dots. When these relationships of ink amounts are taken based on the model ML, which discharges the greatest amounts, then the model KG and the model SP have 9/10 and 8/10 the volume, respectively. Rendering now in terms of the gradation values of the image data, in a case where the same large dot is formed, then should the model ML be understood to have been able to render a concentration equivalent to a gradation value 255, the model KG then would have rendered a concentration equivalent to a gradation value 229 amounting to 9/10 thereof, and the model would have rendered a concentration equivalent to a gradation value of 204. Therefore, FIG. 8 is where the gradation values Vold and Vnew are understood to be defined with combinations of models.

The gradation value Vold will be 255 when the model for which the original data was generated is, for example, the model ML, and the target model is the model SP. The other value Vnew, however, is equivalent to the concentration at which the dots that are actually formed are rendered, and therefore in the subsequent process, is handled as the result value RSLT; this handling shall be described in greater detail below.

The error diffusion process is carried out after the gradation values data has been set from the dot data DD (x, y) in this manner; then, a process for finding corrected data dataX for the error diffusion process is carried out (step S220). The computation that is actually carried out follows equation (1) below.

$$dataX \leftarrow data(x,y) + DE(x,y) \quad (1)$$

Herein, DE (x, y) is the diffusion error that is distributed from the surrounding pixels that have already undergone the diffusion error process. The range of error diffusion provided by the error diffusion process shall be described below.

After this corrected data dataX is found, next, a determination is made as to whether or not the corrected data dataX is greater than a threshold value Dth (step S230). In the present embodiment, the threshold value Dth is the value 127. In a case where the corrected data dataX is determined to be greater than the threshold value Dth, then it is understood that a dot is to be formed, the value 1 is set for converted dot data DN (x, y) (step S240), and next the gradation value Vnew described using FIG. 8 is set for the result value RSLT (step S245). In a case where the corrected data dataX is determined to be the threshold value Dth or lower, however, then it is understood that a dot is not to be formed, the value 0 is set for the converted dot data DN (x, y) (step S250), and next the value 0 is set for the result value RSLT (step S255).

The result value RSLT corresponds to the concentration that is actually realized by the dot formed when the ink droplet is discharged. Therefore, the error diffusion process is next carried out using the result value RSLT (step S260). The error diffusion process itself is well known, and is therefore described only briefly. In step S260, first the error that occurred with respect to this pixel is calculated. The error ΔD that occurred with this pixel is found by the equation (2) below.

$$\Delta D = dataX - RSLT \quad (2)$$

The difference between the corrected data dataX that corresponds to the concentration that was originally to be realized and the actually realized concentration RSLT is the error that occurs at the pixel. Were the original data generation model and the target model to be the same, the target data DD (x, y) and the result value RSLT) would be the same at all pixels, and no error would occur. When the original data generation model and the target model are different, however, then there is a difference between the gradation value Vold for a case where the dot data is formed and the result value RSLT (in other words, the gradation value Vnew) that is realized when the target model forms the dot. In other words, $$\Delta D = dataX - Vnew \quad (3)$$
$$= DE(x, y) + Vold - Vnew$$

Taking the error DE (x, y) from the surrounding pixels into consideration as well, in the example described in this embodiment (where the original data generation model is the model ML and the target model is the model SP), then a gradation error as follows would occur.

$$\Delta D = DE(x, y) + 255 - 204$$
$$= D(x, y) + 51$$

Therefore, with the error diffusion process, this error is next distributed to the surrounding pixels for which the error diffusion process has not yet been carried out. FIG. 9 is a descriptive diagram illustrating the range of distribution of error in the present embodiment, i.e., the diffusion range. As depicted, $7/16$, $3/16$, $5/16$, and $1/16$ of the error that occurs in a pixel (marked with the symbol ★, coordinates (x, y)) currently being processed is distributed to the pixel (x+1, y) neighboring on the right, to the pixel (x−1, y+1) on the lower left, to the pixel (x, y+1) below, and to the pixel on the lower right, respectively. The sum of the distributed amounts is $7/16+3/16+5/16+1/16=1$. The error DE that is distributed to each of the pixels is sequentially accumulated, and would therefore be computed as $$DE(x+1, Y) \leftarrow DE(x+1, y) + \Delta D \cdot (7/16)$$

$$DE(x-1, Y+1) \leftarrow DE(x-1, y+1) + \Delta D \cdot (3/16)$$

$$DE(x, Y+1) \leftarrow DE(x, y+1) + \Delta D \cdot (5/16)$$

$$DE(x+1, Y+1) \leftarrow DE(x+1, y+1) + \Delta D \cdot (1/16).$$

With the above, the error diffusion process is complete.

According to the print system 10 of the present embodiment described above, the number of dots that would be turned ON can be converted to a Vold/Vnew multiple without incurring a reduction in the image quality at a model for which the dot data was not prepared, based on the dot data obtained as a result of a halftone process. As a result, textile printing can be carried out forming an image with minimal change in the output color between models. In the present embodiment, the error diffusion process is carried out imparting a virtual gradation value Vold to pixels where the dot data is the value 1, i.e., pixels where a dot was formed in the original data generation model. For this reason, dot data for the target model can be produced while still retaining the properties possessed by the original dot data, in the present embodiment, the dispersibility of the dot data created by a process that emphasizes dispersibility. With this embodiment, dots are added in a case where Vold>Vnew, and conversely dots are culled in a case where Vold<Vnew. In the case of dot addition, no more dots can be added to an area where the dot data that is the result of the original halftone process has 100% dots on, and therefore the dots On rate for a local area is kept to no higher than Vnew/Vold for the inputted dot data.

Figure 10A:
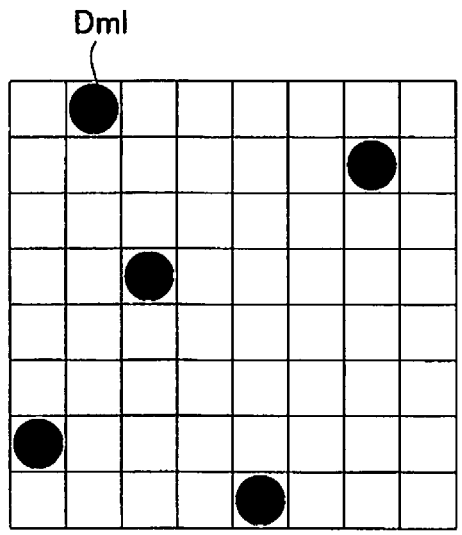
FIGS. 10A and 10B are descriptive views illustratively exemplifying a manner of dot formation.
Figure 10B:
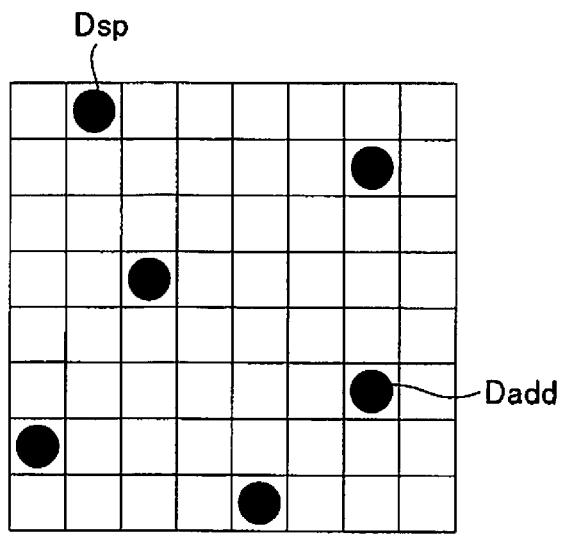

Moreover, the gradation value Vold that is the origin of the error diffusion process and the gradation value Vnew serving as the result value are set taking into consideration the concentration of dots being formed at both models (more specifically, the volume of the ink droplets) in the data conversion process therefor, and thus the number of dots that are on can be converted to a Vold/Vnew multiple, and the concentration of the image formed (referring to color tone with color images) would be close to the concentration (color tone) of the image that is printed with the original model. FIGS. 10A and 10B are descriptive diagrams illustrating this condition. FIG. 10A illustrates the manner in which dots Dml are formed by the original model ML and FIG. 10B illustrates the manner in which dots Dsp are formed at the target model SP. As depicted, in this example, the dots Dsp formed by the target model SP are smaller than the dots Dml formed by the original model ML. The gradation value Vold (herein, the value 255) is given to places where dots were formed in the original model, i.e., to pixels where the dot data is the value 1; the dots are determined to be formed (DN=1) as a result of the comparison with the threshold value Dth, and the error of ΔD=Vold−Vnew) occurs as a result of subjecting same to the error diffusion process. Because no gradation value is imparted to pixels where dots are not formed in the original model even though this error is distributed to the surrounding pixels, the cumulative value of error does not exceed the threshold value Dth nor are new dots formed at the majority of pixels.

However, when the error produced by the error diffusion process is being accumulated, however, the cumulative value of the error will eventually at some point exceed the threshold value Dth, and a new dot Dadd is formed. When dots are formed at pixel positions where dots were not formed in the original model, those pixels experience a negative error which is distributed to the surrounding pixels. As such, dots are less likely to be formed in the area around the newly generated dot Dadd. For this reason, the dispersibility possessed by the original dot data is not majorly compromised.

The present working example had Vold>Vnew, but as illustrated in FIG. 8, combinations such as where the original data generation model is the model KG and the target model is the model ML would have Vold<Vnew. In such a case, when dots are formed without alteration at places where dots were formed in the original model, a negative error occurs and continues accumulating. When the absolute value of the accumulated negative error increases, in some resulting instances the value of the dataX will be the threshold value or lower even with places where dots were formed in the original model. Then, dots are not formed at those pixel positions, and dots are culled.

It would be conceivable to apply a halftone technique other than error diffusion, e.g., ordered dithering or blue noise masking, which is a form thereof, as the technique for printing using previously halftoned dot data between different models. With halftone processes for ordinary continuous tone data, dithering using a blue noise mask obtains halftone results that possess dispersibility of such an extent as to be indistinguishable from an error diffusion technique. Therefore, the inventors have also attempted culling processes using a variety of dithering techniques such as blue noise masking. For example, to reduce the number of dots generated by 20% with dithering, thought is given to using dither masks having threshold values from 1 to 255 to binarize the gradation values of pixels for which the halftone results of the original print machine were dot ON, using those with 204, which is 80% of 255, as input data and having dot ON when the data is the dither threshold value or higher and having dot OFF when the data is less than the dither threshold value. With this technique, too, 20% of the dots could have been culled from the original dot data, but the deterioration in graininess is very large and not suitable for practical usage. This is due to the fact that dithering is a technique where an optimal dot arrangement is first obtained under the condition that the input data has small local changes, i.e., the high-frequency component is small. When input gradation values are viewed in pixel units, the previously halftoned data has major changes in gradation values between the pixels where the dots are on and the pixels where the dots are off. Favorable dot dispersibility cannot be realized in a case where such previously halftoned dot data is taken as input. By contrast, with the technique set forth in the embodiment, in which error diffusion is used, favorable dot dispersibility is still maintained even after the number of dots is converted. It shall be readily understood that a certain amount of degradation occurs, but it is possible to kept degradation to a low enough extent to not pose a problem in particular in applications for printing onto cloth in textile printing.

The above description has the original data generation model be the model ML and has the target model be the model SP, and refers to data conversion only of a large dot of cyan ink, but dots of other sizes and inks of other colors could also be processed in a similar manner. These processes could be carried out independently of one another. Because the arrangements of the dots of each of the colors and each of the sizes would originally have been an arrangement that has excellent dispersibility, the results from processing same would also similarly have excellent dispersibility, and independently processing does not compromise the excellent properties possessed by the original data.

D. Modification Examples

Modification Example 1

In the embodiment above, the small, medium, and large dots all had the same ratios of volume of the ink droplets for each of the different models. In a case where the original data generation model and the target model have different ratios in the volumes of ink droplets for the small, medium, and large dots, then the gradation values Vold and Vnew illustrated in FIG. 8 should be set for each of the small, medium, and large dots. Also, in the description above, the ratios between the gradation values Vold and Vnew were found by the volumes of the ink droplets, but the ratios between Vold and Vnew may also be set by actually forming dots and measuring the densities thereof.

Modification Example 2

In the embodiment above, the gradation values Vold and Vnew were set as the ratios of volumes of ink droplets between the different models. Alternatively, the gradation values Vold and Vnew may be determined by the following technique. The decision to increase or decrease the dots with an increase-decrease rate DP (0<DP<1) is made from the dot data created for the original data generation model. For example, DP would=−0.2 in a case where the number of dots formed in the original dot data is being reduced by 20%. At this time, the gradation values Vold and Vnew are set by the formula (4) below.

$$V\text{new}=V\text{old}/(1+DP) \quad (4)$$

Herein, where the gradation value Vnew in the dot data actually used for the textile print machine is 255, then $$255=V\text{old}/(1-0.2)$$

$$V\text{old}=204$$

This is equivalent to a case such as where the original data generation model is the model SP and the target model is the model ML, inversely to the example described in the embodiment above. In other words, the increase-decrease rate DP may be set as appropriate by a user from the condition of the image, and may be found from the volume ratios of ink droplets as per FIG. 6.

Modification Example 3

In the embodiment above, the error was found by the formula (3), i.e., as $$\Delta D=\text{data}X-V\text{new} \quad (3)$$

at pixels where data conversion found that dots were to be formed. As such, with a case where the dots are being increased, the error $\Delta D$ would ordinarily take a negative value at pixels where it is determined that new dots are to be formed, and the formation of dots in the surrounding pixels is suppressed. In a case where the error $\Delta D$ at a pixel where a new dot is to be formed is not negative as a result of running the calculation in formula (3), then error would be said to still remain even though the dot is formed, and therefore an error that is too much to eliminate would carry on accumulating. More specifically, in a case where the halftoning at the original print machine results in there being a region in which the proportion of dot-ON pixels exceeds Vnew/Vold, then such a situation would occur because the ON dots would still be insufficient even though all pixels would have been made ON dots. Therefore, in such a case, after computation by the formula (3), the calculation $$\Delta D=\Delta D-V\text{old}+V\text{new} \quad (5)$$

should also be carried out. When formula (3) is plugged into the right side of formula (5), then $$\Delta D=\text{data}X-V\text{old}$$

and the error would be eliminated because the gradation value Vold corresponding to the original dots would be used as the result value for a case where a new dot is being formed. In such a case, simply $\Delta D=0$ may also be used.

Modification Example 4

In a case where the textile print machine is able to form a plurality of dots, such as small and large dots or small, medium, and large dots, then it would also be easy to have only specific dots, such as only small dots or only medium dots, be subject to the data conversion. In a case where the dots that are subject to conversion are the small dots, then larger dots (medium dots or large dots) may have the dots culled or increased by another technique. For example, with a 25% increase, dots at places where the coordinate x is divisible by the number 4 would be culled, or the like.

Modification Example 5

In the description above, the process for increasing or culling a plurality of types of dots, such as small, medium, and large dots was understood to be carried out independently for each of the different types of dots, but provided that the error can be eliminated, the error may be computed for every dot of each of the types and then the error stored into an error buffer for small dots. For example, in a case where the data conversion is being carried out between textile print machines that form small dots, the volumes of the ink droplets for large droplets being only slightly different (for example, 250 versus 255 by volume), then the error $\Delta D=5$ that occurs due to the formation of the large dots may be stored in an error buffer for determining the formation of small dots. This is because the impact on image quality can be reduced by using the small dots, provided that the concentration error can be eliminated by increasing or reducing the formation of small dots.

Modification Example 6

With the data conversion process illustrated in FIG. 7, the error diffusion process (step S260) is understood to be carried out even in a case where dots are not being formed (step S230: "NO"). By contrast, in a case where dots are not being formed, then the value of an error diffusion buffer may simply be transferred to an error diffusion buffer for pixels corresponding to the raster immediately therebelow, without carrying out the error diffusion process. The process can be sped up because the error diffusion process is not being carried out. In a case where dots are understood to be culled by the data conversion, then there is no possibility that new dots could be formed at pixels where dots were not originally formed, and thus it would be easy to detect that dots are not formed across a plurality of pixels in a case where, for example, the original dot data has been compressed by run-length encoding. For example, in a case where run-length data results in detection that dots are not formed over one raster, then the process for steps S200 to S260 relating to that raster need not be carried out, and it would suffice to simply shift the data for the error diffusion buffer over. So doing makes it possible to greatly speed up the data conversion process.

Modification Example 7

In the embodiment above, the threshold value Dth had the value 127 and was handled as a fixed value. By contrast, the threshold value Dth may have a value corresponding to the corrected data dataX. For example, the setting may be $$Dth=(Vnew/2+data)/2 \qquad (6)$$

In a case where the gradation values associated with the dot data DD (x,y) of the original data generation model that is originally read out are only the two values 0 or Vold, then if dot data DD (x, y)=0, then Dth=Vnew/4, and if dot data DD (x,y)=1, then Dth=Vnew/4+Vold/2, both of which give the same result as formula (4). As such, the threshold value Dth may be set in this manner. For example, Japanese Patent No. 3360391 and the like disclose in greater detail the fact that when the threshold value Dth is set in correspondence to the input data in a binarization process using error diffusion, then tailing and other forms of undesired dots are not formed, and the resulting image is of high quality.

Modification Example 8

In the present embodiment, the range of error diffusion was fixed to the four pixels illustrated in FIG. 4, but the range of error diffusion may be broader or narrower. The error may also be understood to be distributed over three rasters or more. The range of error diffusion may also be changed depending on the density of dots. In a case where the dot data is compressed by run-length encoding, as mentioned above, it would be easy to detect how many consecutive pixels there are where dots are not formed, from the run-length data. Thus, when a pixel at which a dot is formed is discovered, it would be easy to change the range of error diffusion by how many consecutive pixels there are without a dot being formed until that pixel. The dispersibility of dots is further improved with a configuration such that more consecutive pixels at which dots are not formed results in a broader error diffusion range.

Modification Example 9

Figure 11:
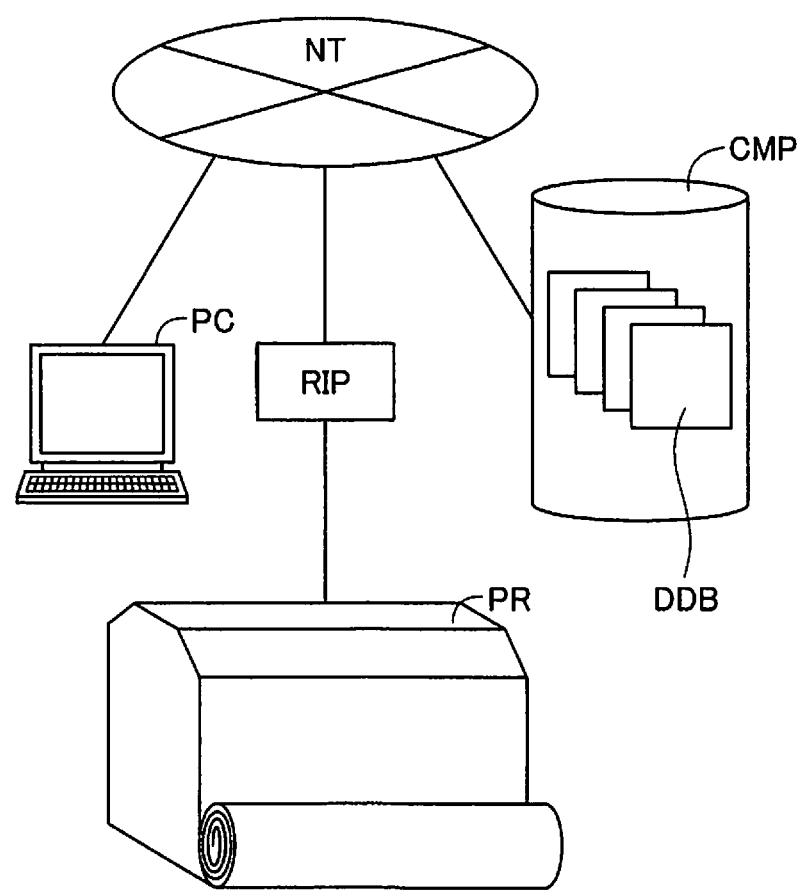
FIG. 11 is a schematic diagram illustrating one example of a modification example of an embodiment.

In the embodiment above, the dot data that was generated for the original textile print machine was saved in the page composer CMP and then summoned, but may instead be stored inside the computer PC connected to the textile print machine that serves as the target. Alternatively, printing may comprise temporarily generating dot data for a model different than the target model, which is then converted to dot data for the target model by the data conversion process of the present embodiment. In this way, textile printing can be carried out even when the printer driver for the target model has not been installed on the connected computer PC. The computer PC and the textile print machine PR also need not necessarily be directly connected, and may, as illustrated in FIG. 11, be connected via the network NT. In such a case, the textile print machine PR may be connected via a raster image processor RIP. In this case, the computer PC selects existing dot data from the database DDB saved on the page composer CMP and outputs a print command to the raster image processor RIP, whereupon the raster image processor RIP reads the designated dot data out from the database DDB of the page composer CMP, subjects same to the data conversion process illustrated in FIG. 7, and outputs the result in sequence to the textile print machine PR. The raster image process RIP may carry out the data conversion process using software, or may do so using hardware circuitry. This image processor RIP could also be built into the print machine or computer in the form of an expansion board.

Modification Example 10

In the embodiment above, the resolutions of the original print machine and the new print machine were the same, but in a case of output with print machines of different resolutions, a bilinear or other interpolation calculation technique may be used on the dot data that is the result of halftoning by the original print machine, to carry out a resolution conversion to the resolution of the new print machine, to then serve as the input data. This increases the number of gradations of the input data. FIGS. 12A to 12C illustrate the manner in which resolutions are converted. FIG. 12A illustrates the original halftone process result. The intermediate data in FIG. 12B illustrates an example where the resolution of the dot data is reduced to ½ both vertically and horizontally. In a case where the dot ON gradation value of the original print machine is 255, as in the first working example, then the mean value of four pixels would be the gradation value of a pixel after resolution conversion (the diagram is rounded off to the closest whole number). For this reason, the binary data becomes quinary data after the resolution conversion. The quinary data are as follows.

<1> When all four pixels have no dot (0): Intermediate data 0

<2> When a dot is formed at one of the four pixels: Intermediate data 64

<3> When dots are formed at two of the four pixels: Intermediate data 128

<4> When dots are formed at three of the four pixels: Intermediate data 191

<5> When all four pixels have dots (255): Intermediate data 255

As with the first working example, upon proper setting of Vnew for the input data, the error diffusion technique is applied with comparison against the threshold value (for example, 127), whereupon an output by which the dot generation number is converted to a 255/Vnew multiple is obtained. Because the resolution is vertically and horizontally ½, this becomes ¼ thereof when viewed by the dot generation number per unit area. By a similar approach, the resolution conversion could take a 1/m multiple vertically and a 1/n multiple horizontally (where m and n are each integers and either m or n is a value 2 or greater).

Even in a case where the output resolutions of the original print machine and the new print machine, printing may be done with a lowered apparent resolution in textile printing applications where a very high output resolution is not required and so forth. This manner of resolution conversion shall now be described using FIGS. 12A to 12C. The resolution of the original dot data (FIG. 12A) is first reduced to ½, and converted to the intermediate data illustrated in FIG. 12B. Next, the intermediate data is used as input data to convert the resolution to horizontally and vertically double, i.e., to the original resolution. FIG. 12C illustrates the converted dot data. Thereafter, a dot increase/decrease process by an error diffusion technique is carried out, as with the first working example. In such a case, too, the dot generation rate can be converted to 255/Vnew. Using such intermediate data makes it possible to reduce the amount of data transferred or speed up the process. It shall be readily understood that this type of resolution conversion could specify an arbitrary pixel range such as by taking vertically and horizontally ⅓ of the resolution of the original dot data and then taking three times thereof to return to the original. The vertical and horizontal pixel ranges may also be changed to carry out different resolution conversions for the vertical and horizontal directions.

Other Modification Examples

In addition, the present invention can be applied to image formation using print machines other than textile print machines, e.g., print machines for printing onto paper, resin sheets, or the like. It shall be readily understood that application to a special print machine such as for manufacturing semiconductors would also be possible. The configurations, number, and types of ink colors used by the print machine are also not limited, and the present invention could also be applied to: a CMYK four-color printer; a six-color printer provided with light-colored inks LC, LM for CMYK; a printer provided with special colors other than the blue, orange, and red illustrated in the embodiment; a monochromatic printer; or the like. Additionally, with the inkjet type, the present invention could further be applied to a printer using actuators other than piezoelectric elements, e.g., a printer of the Bubble Jet™ format. A variety of printers other than inkjet printers may also be used, such as a thermal transfer format, thermal sublimation format, or microcapsule format. It shall also be readily understood that the present invention could also be applied to a line printer in which the nozzles or other dot formation elements for forming the dots are formed across the width direction of the print medium. The present invention can be used alone as a data conversion device or method therefor.

The present invention is not limited to the embodiment and working example described above, nor to the modification examples, and can be realized in a variety of configurations within a scope that does not depart from the essence thereof. For example, the technical features in the embodiment/working example and modification examples corresponding to the technical features in each of the modes set forth in the Summary of the Invention could be replaced or combined as appropriate in order to partially or entirely solve the above problems, or in order to partially or entirely achieve the above effects. The technical features thereof, where not described as being essential in the description, can also be removed as appropriate.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least f 5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image data processing apparatus for processing previously halftoned data that has been halftoned so that a proportion of dot formation corresponding to gradation values of an image reaches a first dot generation rate, as image data representative of the image, the image data processing apparatus comprising:
   a re-halftone processing unit configured to carry out a re-halftone process by using an error diffusion technique based on first gradation values corresponding to ON-dots in the previously halftoned data; and
   an ON-dot gradation value setting unit configured to set second gradation values corresponding to the ON-dots in the re-halftone process using the error diffusion technique, such that the dot generation rate in the re-halftone process reaches a second dot generation rate different from the first dot generation rate,
   the first gradation values being determined from a relationship between an original print apparatus for which original dot data is generated and a target print apparatus where printing is to be carried out.

2. The image data processing apparatus as set forth in claim 1, wherein
   the first gradation values and the second gradation values are determined in accordance with a concentration per unit area to be realized on a medium by each of dots being formed.

3. The image data processing apparatus as set forth in claim 1, wherein
   a relationship $V2=V1/(1+DP)$ is achieved between an increase-decrease rate DP for a number of dots after the re-halftone process based on the previously halftoned data, and each of the first gradation values V1 and each of the second gradation values V2.

4. The image data processing apparatus as set forth in claim 1, wherein
the previously halftoned data is data representative of whether or not a dot is to be formed for every dot of a first type in a first print apparatus configured to form dots of the first type, and the data obtained by the re-halftone process is data representative of whether or not to form every dot that can be formed for every dot of a second type that is formed in a second print apparatus different from the first print apparatus.

5. A print apparatus comprising:
the image data processing apparatus as set forth in claim 1; and
a print part configured and arranged to carry out printing by using the dot data processed by the image data processing apparatus.

6. The print apparatus as set forth in claim 5, wherein
the print part is configured and arranged to form the dots of a second type different from the dots of a first type that can be formed in another print apparatus, by discharging ink droplets onto a cloth.

7. A print system for printing onto a predetermined print medium, the print system comprising:
a data storage apparatus configured to store a plurality of sets of previously halftoned data that has been halftoned so that a proportion of dot formation corresponding to gradation values of an image reaches a first dot generation rate;
a re-halftone processing apparatus for which input data is data selected from the stored plurality of sets of previously halftoned data and which is configured to re-halftone the input data using an error diffusion technique so as to reach a second dot generation rate different from the first dot generation rate; and
a target print apparatus configured and arranged to accept the previously re-halftoned data and printing by forming predetermined dots on a print medium,
the re-halftone processing apparatus being configured to set to different values the first gradation values corresponding to ON-dots in the previously halftoned data and second gradation values corresponding to the ON-dots in the re-halftone process using the error diffusion technique which are to be formed on the print medium,
the first gradation values being determined from a relationship between an original print apparatus for which original dot data is generated and the target print apparatus where printing is to be carried out.

8. A method for converting image data representative of an image, using as input data previously halftoned data that has been halftoned so that a proportion of dot formation corresponding to gradation values of the image reaches a first dot generation rate, the method comprising:
using an error diffusion technique to re-halftone the input data so as to reach a second dot generation rate different from the first dot generation rate; and
setting to different values the first gradation values corresponding to ON-dots in the previously halftoned data and second gradation values corresponding to the ON-dots in the re-halftone process using the error diffusion technique,
the first gradation values being determined from a relationship between an original print apparatus for which original dot data is generated and a target print apparatus where printing is to be carried out.

* * * * *